United States Patent
Colbachini

(10) Patent No.: US 7,516,762 B2
(45) Date of Patent: Apr. 14, 2009

(54) CORRUGATED FLEXIBLE PIPE WITH A BUILT-IN ELECTRIC CABLE

(75) Inventor: Guiseppe Aldinio Colbachini, Cervarese Santa Croce Padova (IT)

(73) Assignee: IVG Colbachini, S.p.A., Cervarese Santa Roca-Padova (IT)

( * ) Notice: Subject to any disclaimer, the term of this patent is extended or adjusted under 35 U.S.C. 154(b) by 0 days.

(21) Appl. No.: 11/801,149

(22) Filed: May 9, 2007

(65) Prior Publication Data
US 2008/0017265 A1    Jan. 24, 2008

(30) Foreign Application Priority Data
Jul. 21, 2006    (IT)    ............ MI2006A1436

(51) Int. Cl.
    *F16L 11/00*    (2006.01)
(52) U.S. Cl. .............. 138/122; 138/121; 138/126; 138/133; 138/134; 138/174; 138/127; 174/47
(58) Field of Classification Search .......... 138/121, 138/122, 126, 127, 133, 134, 172, 174; 174/47
    See application file for complete search history.

(56) References Cited

U.S. PATENT DOCUMENTS

| | | | | |
|---|---|---|---|---|
| 3,938,929 A | * | 2/1976 | Stent et al. ............ | 425/501 |
| 4,167,645 A | * | 9/1979 | Carey ................... | 174/47 |
| 4,186,778 A | * | 2/1980 | Carey ................... | 138/103 |
| 4,354,051 A | * | 10/1982 | Kutnyak ............... | 174/47 |
| 4,490,575 A | * | 12/1984 | Kutnyak ............... | 174/47 |
| 4,693,324 A | * | 9/1987 | Choiniere et al. ...... | 174/47 |
| 5,416,270 A | * | 5/1995 | Kanao .................. | 174/47 |
| 5,555,915 A | * | 9/1996 | Kanao .................. | 138/133 |
| 5,778,940 A | * | 7/1998 | Tucker et al. .......... | 138/127 |
| 6,103,971 A | * | 8/2000 | Sato et al. ............. | 174/47 |
| 6,227,249 B1 | * | 5/2001 | Akedo et al. .......... | 138/137 |
| 6,827,109 B2 | * | 12/2004 | McCaughtry ......... | 138/134 |

\* cited by examiner

*Primary Examiner*—Patrick F Brinson
(74) *Attorney, Agent, or Firm*—James V. Costigan; Hedman & Costigan, P.C.

(57) ABSTRACT

A flexible corrugated pipe, of a type comprising a plurality of overlapping material layers, comprises at least a coiled wire, and at least an electric cable, the coils or turns of said at least a wire and said at least an electric cable being arranged on a same plane, inside the wall of the pipe owing to the provision of the built-in electric cable, embedded in the thickness of the corrugated pipe, at a same position or level as the reinforcement metal coils, the outer corrugating configuration of the body of the tube is improved, thereby consequently improving the flexibility of the corrugated pipe.

2 Claims, 1 Drawing Sheet

CORRUGATED FLEXIBLE PIPE WITH A BUILT-IN ELECTRIC CABLE

BACKGROUND OF THE INVENTION

The present invention relates to an improved corrugated pipe, of a type including a built-in electric cable, embedded in the pipe construction.

The field of the invention is that of the flexible corrugated pipes, further including an electric cable embedded in the thickness of the pipe and conventionally used for transmitting data.

Actually, flexible pipes or tubes for transmitting fluid in general (such as gases, liquids, powders and son on), are further designed, in some embodiments thereof, to also exchange data, between the pipe connection points, through electric cables built-in in said pipe.

SUMMARY OF THE INVENTION

Starting from the above mentioned status of the art, the aim of the present invention is to provide such a corrugated pipe, in which the electric cable constitutes a functional and active component of the flexible pipe, that is an active component further designed for improving the flexibility or elastic properties of the corrugated pipe.

Actually, it is well known that, among the main properties of such a corrugated pipe, the flexibility of the pipe is a very important constructional characteristic, affecting the pipe handling properties, and favoring the application of the pipe in small spaces, without any risks of undesirably deforming the body of the pipe.

According to one aspect of the invention, the above aim, as well as further objects of the invention, are achieved by the flexible corrugated pipe according to claim 1.

Further preferred embodiments of the invention are defined in the remaining claims.

Since the electric cable is built-in through the thickness of the corrugated pipe, at a same position or level as the reinforcement metal coils or turns, the outer corrugated pattern of the pipe body is improved, thereby consequently improving the flexibility of the corrugated pipe.

BRIEF DESCRIPTION OF THE DRAWING

The above mentioned aim and objects, as well as yet other objects, advantages and features of the invention will become more apparent hereinafter from the following disclosure of a preferred embodiment of the inventive pipe, which is shown, by a broken-away schematic exemplary view, in the sole figure of the accompanying drawing.

More specifically, the corrugated pipe according to the present invention comprises a flexible corrugated pipe, having an innermost layer or sub-layer made of a rubber material.

Figure 1:
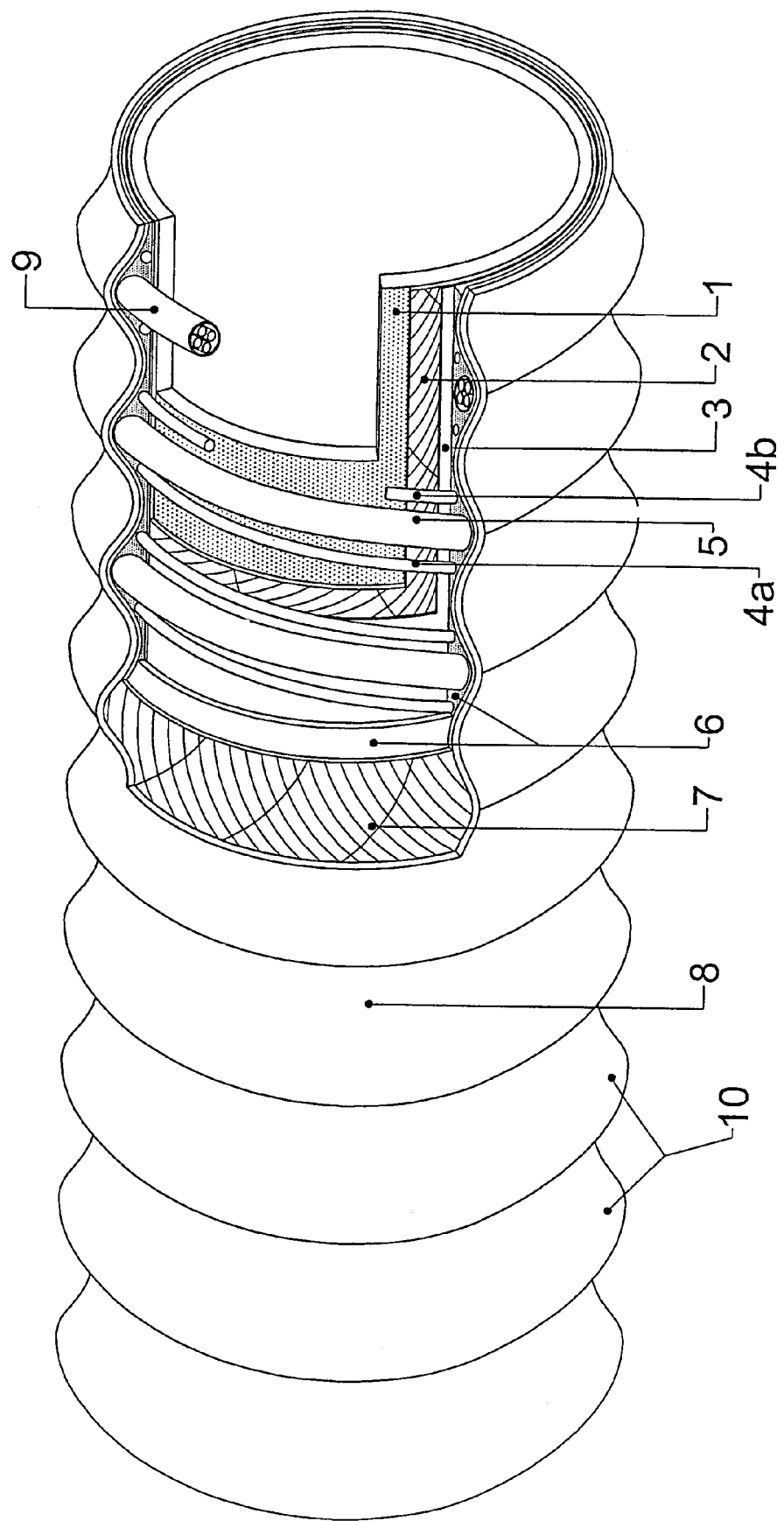

On said sub-layer 1 are overlapped, successively, a first layer 2 made of a pressure resistant fabric material, and a rubber layer 3.

Said rubber layer 3 is furthermore overlapped by metal wire coils or turns 4 and 4b and the coils 5 of an electric cable 9 thereby providing, substantially at the same level as the pipe wall, wire turns or coils 4a, 4b and electric cable 9 coils 5 alternatively arranged.

The level or wall portion of the pipe thickness housing the above mentioned metal wire and electric cable 9 coils or turns, is then filled-in by a third rubber layer 6, in turn protected at first by a second fabric layer 7 and, finally, by an outer rubber covering layer 8.

The above disclosed arrangement of the electric cable 9 inside the pipe wall, at the same height or same level as the wires 4a, 4b, favors a formation of embossed corrugated patterns on the body of the pipe, with an increasing of the pipe flexibility with respect to an embodiment thereof providing the electric cable 9 arranged on a different layer.

Advantageously, according to the invention, the flexibility of resilient properties of the pipe can be further increased by including in said pipe a larger diameter electric cable adapted to be fitted to the pipe size.

The invention, as herein disclosed by way of a non limitative example, can be subjected to several variations and modifications, all of which will enter the scope of the accompanying claims.

Thus, for example, the pipe of the invention can be made starting from different materials, arrangements of the individual layers forming the pipe, while holding unaltered the mutual positions of the metal wire and electric cable turns, the coils of which are alternatively arranged at the same height or level of the pipe wall.

Furthermore, the pipe could also comprise a different number of metal wires (for example only one instead of two) which moreover can consists of coiled wires or threads made of any desired materials (for example a plastic material), provided that they are suitable for the intended application.

The invention claimed is:

1. A corrugated flexible pipe, of a type comprising a plurality of overlapping material layers, and comprising at least a coiled wire and at least an electric cable, wherein said at least a coiled wire comprises a plurality of wire coils and said electric cable comprises a plurality of electric cable coils, which coils are arranged on a same plane, inside the wall of said pipe wherein said wire coils are embedded in the wall of the pipe, and being alternately arranged with the corresponding coils of said electric cable and said corrugated flexible pipe comprises from the inside out a first inner layer or sub-layer; at least a fabric layer; a rubber layer arranged above said fabric layer; said plurality of alternating wire coils and said pluratity of electric cable coils arranged above said rubber layer; a filling-in rubber layer for filling in the spaces between said coils; and a covering layer.

2. A pipe according to claim 1, wherein said at least an electric cable has a diameter larger than that of said at least a coiled wire.

* * * * *

UNITED STATES PATENT AND TRADEMARK OFFICE
CERTIFICATE OF CORRECTION

PATENT NO. : 7,516,762 B2  Page 1 of 1
APPLICATION NO. : 11/801149
DATED : April 14, 2009
INVENTOR(S) : Giuseppe Aldinio Colbachini It is certified that error appears in the above-identified patent and that said Letters Patent is hereby corrected as shown below:

Title page Item (75) Inventor's name should read: "Giuseppe Aldinio Colbachini"

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,516,762 B2
APPLICATION NO. : 11/801149
DATED : April 4, 2009
INVENTOR(S) : Giuseppe Aldino Colbachini It is certified that error appears in the above-identified patent and that said Letters Patent is hereby corrected as shown below:

Title page Item [73] Assignees address should read: --CERVARESE SANTA CROCE (PADOVA) ITALY--

Signed and Sealed this

Twenty-second Day of June, 2010

David J. Kappos
*Director of the United States Patent and Trademark Office*